US012607506B2

(12) United States Patent
    Yokota et al.

(10) Patent No.: US 12,607,506 B2
(45) Date of Patent: Apr. 21, 2026

(54) COLOR MEASURING SYSTEM, BACKING PLATE, AND COLOR MEASURING APPARATUS

(71) Applicant: SEIKO EPSON CORPORATION, Tokyo (JP)

(72) Inventors: So Yokota, Matsumoto (JP); Katsumi Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 340 days.

(21) Appl. No.: 18/065,381

(22) Filed: Dec. 13, 2022

(65) Prior Publication Data

US 2023/0194340 A1     Jun. 22, 2023

(30) Foreign Application Priority Data

Dec. 16, 2021    (JP) ................................. 2021-204012

(51) Int. Cl.
    *G01J 3/46*      (2006.01)
    *G01D 5/14*      (2006.01)
    *G01J 3/02*      (2006.01)
    *G01J 3/10*      (2006.01)
    *G01J 3/50*      (2006.01)

(52) U.S. Cl.
    CPC ............. *G01J 3/0267* (2013.01); *G01D 5/14* (2013.01); *G01J 3/10* (2013.01); *G01J 3/50* (2013.01)

(58) Field of Classification Search
    CPC .... G01J 3/0267; G01J 3/10; G01J 3/50; G01J 3/0264; G01J 3/0272; G01J 3/0283; G01J 3/0289; G01J 3/0291; G01J 3/26; G01J 3/46; G01J 3/0297; G01J 3/524; G01D 5/14

See application file for complete search history.

(56) References Cited

U.S. PATENT DOCUMENTS

| | | | | |
|---|---|---|---|---|
| 3,519,360 A | * | 7/1970 | Kudlek ...................... | G01J 3/46 |
| | | | | 356/244 |
| 10,306,110 B2 | | 5/2019 | Kanai | |
| 11,549,093 B2 | | 1/2023 | Tatsuta et al. | |
| 2012/0327405 A1 | * | 12/2012 | Ebihara ................... | G01J 3/462 |
| | | | | 356/300 |
| 2013/0003063 A1 | * | 1/2013 | Headley .............. | B41F 33/0036 |
| | | | | 356/402 |
| 2013/0257970 A1 | * | 10/2013 | Wakayama .......... | H04N 1/6044 |
| | | | | 356/402 |
| 2017/0126933 A1 | * | 5/2017 | Kanai ................ | H04N 1/00023 |

(Continued)

FOREIGN PATENT DOCUMENTS

| | | | | | |
|---|---|---|---|---|---|
| JP | 2008275587 A | * | 11/2008 | ................ | G01J 3/46 |
| JP | 2013-205067 A | | 10/2013 | | |

(Continued)

*Primary Examiner* — Michelle M Iacoletti
*Assistant Examiner* — Judy Dao Tran
(74) *Attorney, Agent, or Firm* — WORKMAN NYDEGGER

(57) ABSTRACT

A color measuring system includes a color measuring apparatus performing color measurement of a color measurement target, a backing plate disposed under the color measurement target, and an alignment unit with which alignment between the backing plate and the color measuring apparatus is performed in a state where the backing plate is disposed under the color measurement target and entirely covered with the color measurement target.

3 Claims, 7 Drawing Sheets

(56)     References Cited

U.S. PATENT DOCUMENTS

| 2017/0207664 | A1 * | 7/2017 | Garrity .................. H01F 38/14 |
|---|---|---|---|
| 2018/0252584 | A1 * | 9/2018 | Yamanoi ............... G01J 3/0275 |
| 2018/0299378 | A1 * | 10/2018 | Morikawa .......... G01N 21/5911 |
| | | | 356/228 |
| 2020/0172848 | A1 | 6/2020 | Tatsuta et al. |

FOREIGN PATENT DOCUMENTS

| JP | 2015039271 | A | * | 2/2015 |
|---|---|---|---|---|
| JP | 2017-083356 | | | 5/2017 |
| TW | M495506 | U | * | 2/2015 |
| WO | 2018/235477 | | | 12/2018 |

* cited by examiner

COLOR MEASURING SYSTEM, BACKING PLATE, AND COLOR MEASURING APPARATUS

The present application is based on, and claims priority from JP Application Serial Number 2021-204012, filed Dec. 16, 2021, the disclosure of which is hereby incorporated by reference herein in its entirety.

BACKGROUND

1. Technical Field

The present disclosure relates to a color measuring system including a color measuring apparatus and a backing plate. The present disclosure also relates to a backing plate and a color measuring apparatus used for color measurement.

2. Related Art

In color measurement using a color measuring apparatus, when a color measurement target is a thin and highly optically transparent object such as a sheet material, a measurement value may be affected by the background color, and an accurate measurement value may not be obtained. In order to avoid such a problem, a backing member is disposed under a color measurement target in the related art as described in JP-A-2013-205067. The color used for the backing member is white or black, and the performance is prescribed in ISO 13655, which is an international standard.

When a portably configured color measuring apparatus is used, a backing member is demanded to be miniaturized in consideration of portability. However, when the area of the backing member is smaller than the area of the color measurement target due to miniaturization of the backing member, the backing member is entirely hidden under the color measurement target. Thus, it is difficult to know the position of the backing member, and the color measurement position may be located outside the backing member.

SUMMARY

A backing plate according to the present disclosure for solving the above problem is a backing plate disposed under a color measurement target to be subjected to color measurement by a color measuring apparatus, the backing plate including a light-emitting unit configured to emit light toward the color measurement target.

A backing plate according to the present disclosure is a backing plate disposed under a color measurement target to be subjected to color measurement by a color measuring apparatus, the backing plate including a magnet at a position facing the color measuring apparatus.

A color measuring system according to the present disclosure includes a color measuring apparatus configured to perform color measurement of a color measurement target, a backing plate disposed under the color measurement target, and an alignment unit with which alignment between the backing plate and the color measuring apparatus is performed in a state where the backing plate is disposed under the color measurement target and entirely covered with the color measurement target.

A color measuring apparatus according to the present disclosure is a color measuring apparatus performing color measurement of a color measurement target, the color measuring apparatus including a power-transmitting coil at a position facing a backing plate disposed under the color measurement target, wherein the power-transmitting coil supplies power to a light-emitting unit provided at the backing plate via a power-receiving coil provided at the backing plate.

A color measuring apparatus according to the present disclosure includes an apparatus-side magnet at a position facing a backing plate disposed under the color measurement target, wherein a polarity, facing the backing plate, of the apparatus-side magnet is opposite to a polarity, facing the color measuring apparatus, of a plate-side magnet provided at the backing plate.

A color measuring apparatus according to the present disclosure is a color measuring apparatus performing color measurement of a color measurement target, the color measuring apparatus including a magnetic sensor at a position facing a backing plate disposed under the color measurement target, wherein the magnetic sensor is at a position where a magnet provided at the backing plate is detectable.

DESCRIPTION OF EXEMPLARY EMBODIMENTS

Figure 1:
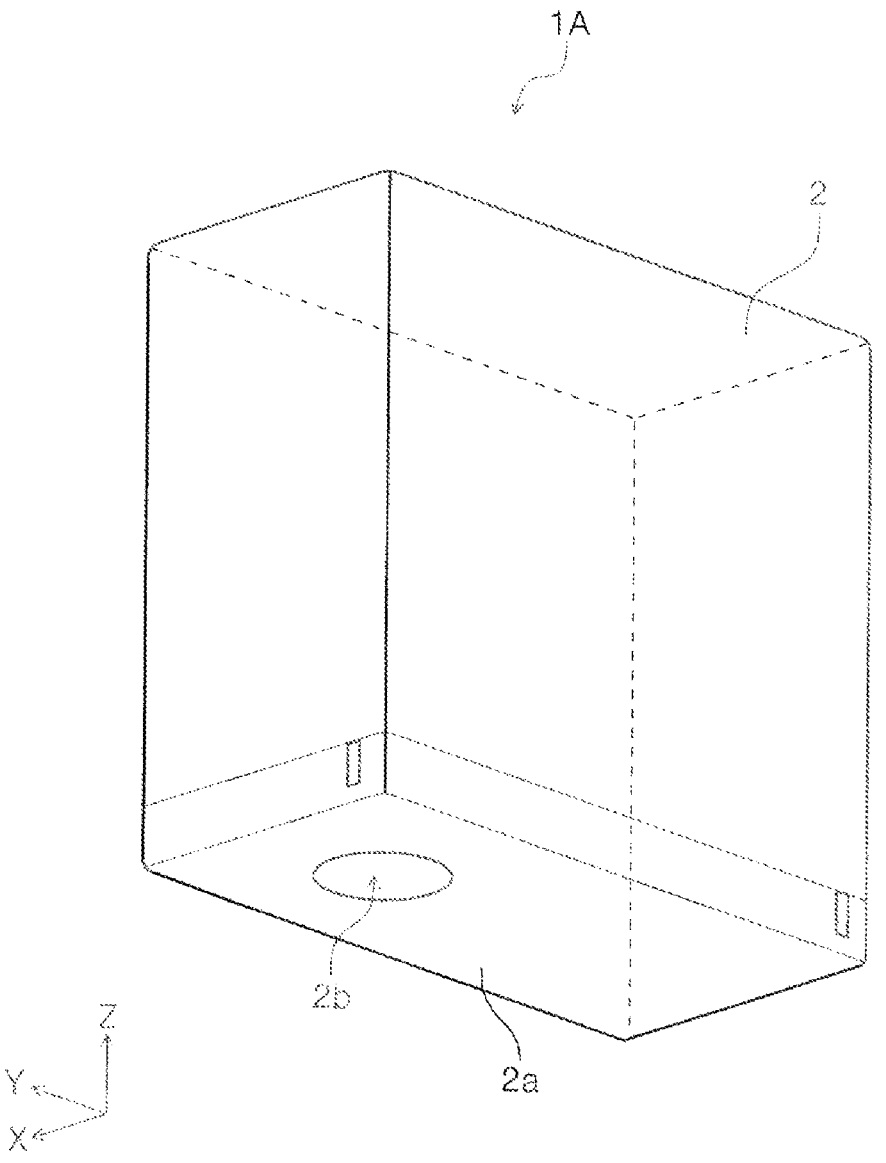
FIG. 1 is a perspective view of a color measuring apparatus viewed from below.

First, the present disclosure will be briefly described.

A backing plate according to a first aspect is a backing plate disposed under a color measurement target to be subjected to color measurement by a color measuring apparatus, the backing plate including a light-emitting unit configured to emit light toward the color measurement target.

According to the first aspect, the backing plate disposed under the color measurement target to be subjected to color measurement by the color measuring apparatus includes the light-emitting unit configured to emit the light toward the color measurement target. Thus, even when the backing plate is entirely hidden under the color measurement target, the light emitted from the light-emitting unit passes through the color measurement target, so that the backing plate and the color measuring apparatus can be aligned, and color measurement can be appropriately performed.

In a second aspect, the backing plate according to the first aspect further includes a power-receiving coil configured to obtain power via a power-transmitting coil provided at the color measuring apparatus, wherein the light-emitting unit receives power from the power-receiving coil and emits light.

According to the second aspect, the backing plate includes the power-receiving coil configured to obtain the power via the power-transmitting coil provided at the color measuring apparatus, and the light-emitting unit receives the power from the power-receiving coil and emits the light. This enables reduction in the thickness of the backing plate, improves the portability of the backing plate, and facilitates a color measurement operation.

A backing plate according to a third aspect is a backing plate disposed under a color measurement target to be subjected to color measurement by a color measuring apparatus, the backing plate including a magnet at a position facing the color measuring apparatus.

According to the third aspect, the backing plate disposed under the color measurement target to be subjected to color measurement by the color measuring apparatus includes the magnet at the position facing the color measuring apparatus. Thus, even when the backing plate is entirely hidden under the color measurement target, the backing plate and the color measuring apparatus can be aligned using the magnet, and color measurement can be appropriately performed.

In a fourth aspect, the backing plate according to the third aspect has a configuration in which a polarity, facing the color measuring apparatus, of the magnet is opposite to a polarity, facing the backing plate, of a magnet provided at the color measuring apparatus.

According to the fourth aspect, the polarity, facing the color measuring apparatus, of the magnet is opposite to the polarity, facing the backing plate, of the magnet provided at the color measuring apparatus. Thus, the backing plate and the color measuring apparatus can be reliably aligned due to an attracting force between the magnet of the backing plate and the magnet of the color measuring apparatus.

A color measuring system according to a fifth aspect includes a color measuring apparatus configured to perform color measurement of a color measurement target, a backing plate disposed under the color measurement target, and an alignment unit with which alignment between the backing plate and the color measuring apparatus is performed in a state where the backing plate is disposed under the color measurement target and entirely covered with the color measurement target.

According to the fifth aspect, the color measuring system includes the alignment unit with which the alignment between the backing plate and the color measuring apparatus is performed. Thus, even when the backing plate is entirely hidden under the color measurement target, color measurement can be appropriately performed.

In a sixth aspect, the color measuring system according to the fifth aspect has a configuration in which the alignment unit includes a light-emitting unit provided at the backing plate, the light-emitting unit being configured to emit light toward the color measurement target.

According to the sixth aspect, the alignment unit includes the light-emitting unit provided at the backing plate, the light-emitting unit being configured to emit light toward the color measurement target. Thus, even when the backing plate is entirely hidden under the color measurement target, the light emitted from the light-emitting unit passes through the color measurement target, so that the backing plate and the color measuring apparatus can be aligned, and color measurement can be appropriately performed.

In a seventh aspect, the color measuring system according to the sixth aspect has a configuration in which the color measuring apparatus includes a power-transmitting coil, the backing plate includes a power-receiving coil configured to obtain power via the power-transmitting coil, and the light-emitting unit receives power from the power-receiving coil and emits light.

According to the seventh aspect, the color measuring apparatus includes the power-transmitting coil, the backing plate includes the power-receiving coil configured to obtain the power via the power-transmitting coil, and the light-emitting unit receives the power from the power-receiving coil and emits the light. This enables reduction in the thickness of the backing plate, improves the portability of the backing plate, and facilitates a color measurement operation.

In an eighth aspect, the color measuring system according to the fifth aspect has a configuration in which the alignment unit includes an apparatus-side magnet provided at a position facing the backing plate in the color measuring apparatus, and a plate-side magnet provided at a position facing the color measuring apparatus in the backing plate, the apparatus-side magnet and the plate-side magnet are configured to face each other, and have opposite polarities facing each other.

According to the eighth aspect, the alignment unit includes the apparatus-side magnet provided at the color measuring apparatus and the plate-side magnet provided at the backing plate, the apparatus-side magnet and the plate-side magnet are configured to face each other, and have opposite polarities facing each other. Thus, the backing plate and the color measuring apparatus can be reliably aligned due to an attracting force between the apparatus-side magnet and the plate-side magnet.

In a ninth aspect, the color measuring system according to the fifth aspect has a configuration in which the alignment unit includes a magnet provided at a position facing the color measuring apparatus in the backing plate, and a magnetic sensor provided at the color measuring apparatus, the magnetic sensor being configured to detect magnetism of the magnet.

According to the ninth aspect, the alignment unit includes the magnet provided at the position facing the color measuring apparatus in the backing plate, and the magnetic sensor provided at the color measurement apparatus, the magnetic sensor being configured to detect the magnetism of the magnet. Thus, even when the backing plate is entirely hidden under the color measurement target, the magnetic sensor detects the magnetism of the magnet, so that the backing plate and the color measurement apparatus can be aligned, and color measurement can be appropriately performed.

In a tenth aspect, the color measuring system according to the ninth aspect has a configuration in which the alignment unit includes a plurality of pairs of the magnet and the magnetic sensor, the color measuring apparatus includes a display unit configured to display information, and when all of the magnetic sensors detect the magnets on another side, a control unit configured to control the display unit displays, on the display unit, information that all of the magnetic sensors detect the magnets on the other side.

According to the tenth aspect, the alignment unit includes the plurality of pairs of magnet and magnetic sensor, the color measuring apparatus includes the display unit configured to display the information, and when all of the magnetic sensors detect the magnets on the other side, the control unit configured to control the display unit displays, on the display unit, the information that all of the magnetic sensors detect the magnets on the other side. This enables a user to easily know that the backing plate and the color measuring apparatus are aligned and thus improves the usability.

A color measuring apparatus according to an eleventh aspect is a color measuring apparatus performing color measurement of a color measurement target, the color measuring apparatus including a power-transmitting coil at a position facing a backing plate disposed under the color measurement target, wherein the power-transmitting coil supplies power to a light-emitting unit provided at the backing plate via a power-receiving coil provided at the backing plate.

According to the eleventh aspect, the power-transmitting coil provided at the color measuring apparatus is configured to supply the power to the light-emitting unit provided at the backing plate via the power-receiving coil provided at the backing plate. Thus, light emitted from the light-emitting unit passes through the color measurement target, so that the backing plate and the color measuring apparatus can be aligned, and color measurement can be appropriately performed.

This also enables reduction in the thickness of the backing plate, improves the portability of the backing plate, and facilitates a color measurement operation.

A color measuring apparatus according to a twelfth aspect is a color measuring apparatus performing color measurement of a color measurement target, the color measuring apparatus including an apparatus-side magnet at a position facing a backing plate disposed under the color measurement target, wherein a polarity, facing the backing plate, of the apparatus-side magnet is opposite to a polarity, facing the color measuring apparatus, of a plate-side magnet provided at the backing plate.

According to the twelfth aspect, the backing plate and the color measuring apparatus can be reliably aligned due to an attracting force between the plate-side magnet and the apparatus-side magnet.

A color measuring apparatus according to a thirteenth aspect is a color measuring apparatus performing color measurement of a color measurement target, the color measuring apparatus including a magnetic sensor at a position facing a backing plate disposed under the color measurement target, wherein the magnetic sensor is at a position where a magnet provided at the backing plate is detectable.

According to the thirteenth aspect, even when the backing plate is entirely hidden under the color measurement target, the magnetic sensor detects magnetism of the magnet. Thus, the backing plate and the color measuring apparatus can be aligned, and color measurement can be appropriately performed.

The present disclosure will be specifically described below.

Note that an XYZ coordinate system illustrated in each of the drawings is an orthogonal coordinate system, the XY plane is a horizontal plane, and the YZ plane and the XZ plane are vertical planes.

The Z-axis direction is a vertical direction and intersects with an upper surface 2c and a bottom surface 2a of a color measuring apparatus 1A. The Z-axis direction is parallel to an optical axis CL described below.

The Y-axis direction is the longitudinal direction of the color measuring apparatus 1A when the apparatus is viewed from the Z-axis direction, and the X-axis direction is the transverse direction of the color measuring apparatus 1A when the apparatus is viewed from the Z-axis direction.

In the present specification, the configuration of the color measuring apparatus 1A will be described on the assumption that the color measuring apparatus 1A is placed on a color measurement target Pb having a surface parallel to the horizontal plane and that the longitudinal direction of the color measuring apparatus 1A is along the Y-axis direction.

Figure 2:
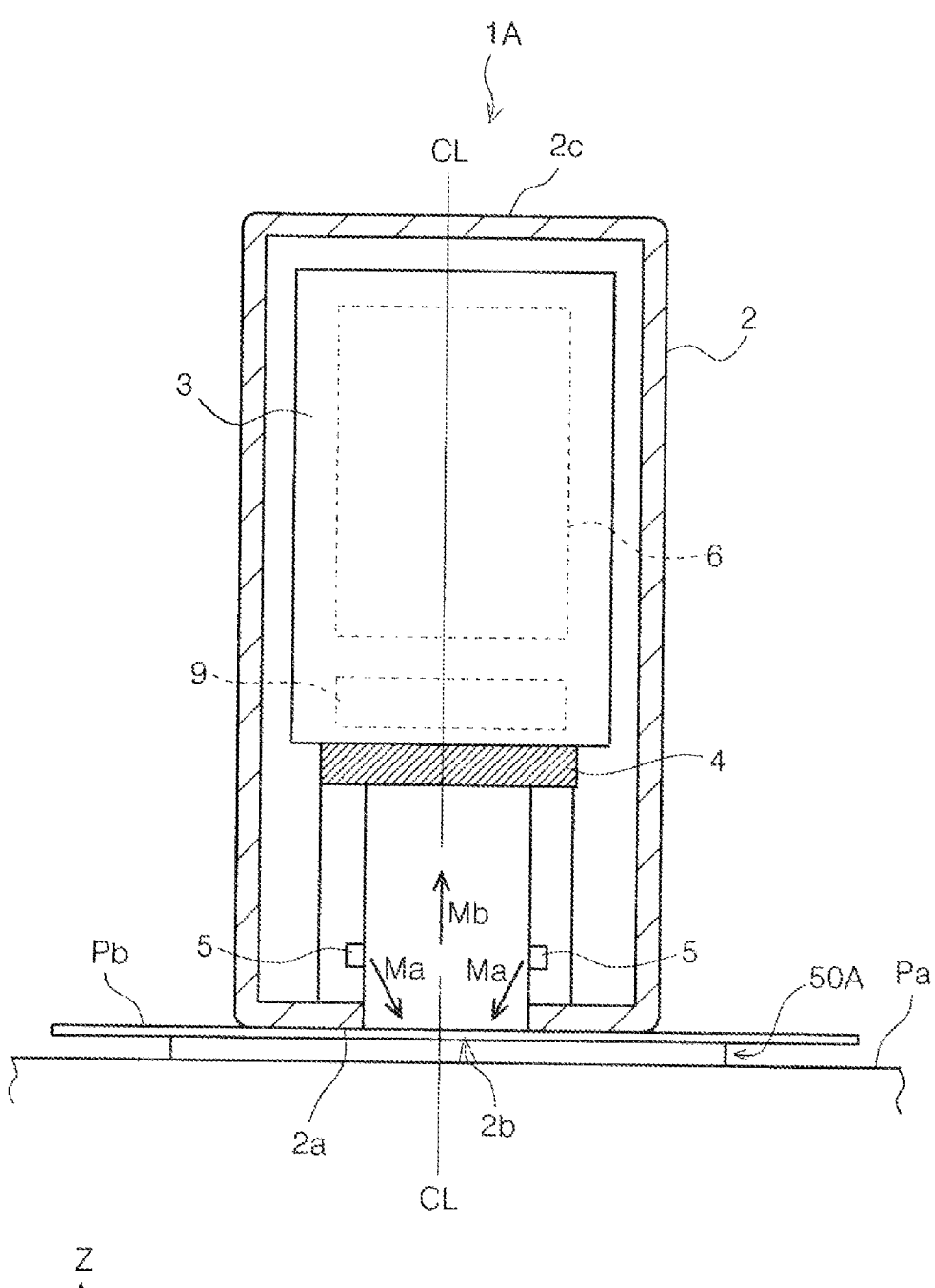
FIG. 2 is a cross-sectional view of the color measuring apparatus taken along an XZ plane at a center position of an opening portion.

In FIGS. 1 and 2, the color measuring apparatus 1A is configured to perform color measurement based on light Mb from the color measurement target Pb.

The color measuring apparatus 1A includes an apparatus internal unit 3 inside a housing 2 constituting an outer shell of the apparatus. In other words, the apparatus internal unit 3 is covered with the housing 2. The length of the housing 2 in the Y-axis direction is longer than the length thereof in the X-axis direction. A user grasps and uses the apparatus in a state the side surface of the apparatus in the −Y direction is directed toward the user.

The apparatus internal unit 3 includes an incident light processing unit 4 processing the light Mb incident on the inside of the apparatus. A detailed description of the incident light processing unit 4 is omitted, but in the embodiments, the incident light processing unit 4 includes an optical filter (not illustrated).

This optical filter selectively passes a given wavelength component of the light Mb incident on the inside of the apparatus. The light passing through this optical filter is incident on a light-receiving element (not illustrated), specifically a photodiode. The intensity of the incident light is converted into a voltage value, and the voltage value is output to a control unit (not illustrated). The color measuring apparatus 1A measures the spectrum of the color measurement target Pb by repeating the wavelength selection by the optical filter and the acquisition of the light intensity. The optical filter is a wavelength-variable Fabry-Perot etalon in the embodiments, which is a wavelength filter utilizing multiple interferences between two reflecting surfaces facing each other. Of course, the incident light processing unit 4 is not limited to a configuration including such an optical filter.

The wavelength-variable Fabry-Perot etalon is configured to select a wavelength by controlling the Z-axis spacing between a pair of mirrors (not illustrated) disposed to face each other at an interval in the Z-axis direction.

An opening portion 2b is formed through the bottom surface 2a of the apparatus, and the light Mb from the color measurement target Pb toward the incident light processing unit 4 is taken into the inside of the apparatus through the opening portion 2b. The opening portion 2b is an opening portion having a perfect circular shape about the optical axis CL. The optical axis CL is an optical axis of the light Mb from the color measurement target Pb toward the incident light processing unit 4.

The apparatus internal unit 3 includes a light-emitting unit 5 inside the opening portion 2b. The light Ma emitted from the light-emitting unit 5 is directed toward the outside of the apparatus through the opening portion 2b, and the color measurement target Pb facing the bottom surface 2a is irradiated with the light Ma.

Further, the apparatus internal unit 3 includes a battery 6 for color measurement, which is a power supply source of the apparatus, and power is supplied from the battery 6 for color measurement to the incident light processing unit 4, the light-emitting unit 5, and the like, via a voltage adjustment circuit (not illustrated).

In FIG. 2, the reference sign 9 denotes a control unit performing various types of control of the color measuring apparatus TA.

First Embodiment

Next, a color measuring system 100A, a color measuring apparatus 1A, and a backing plate 50A according to a first embodiment will be described with reference to FIGS. 3 and 4. The color measuring system 100A includes the color measuring apparatus 1A performing color measurement of the color measurement target Pb, and the backing plate 50A disposed under the color measurement target Pb. The reference sign Pa denotes a placement surface where the color measurement target Pb and the backing plate 50A are placed.

Figure 3:
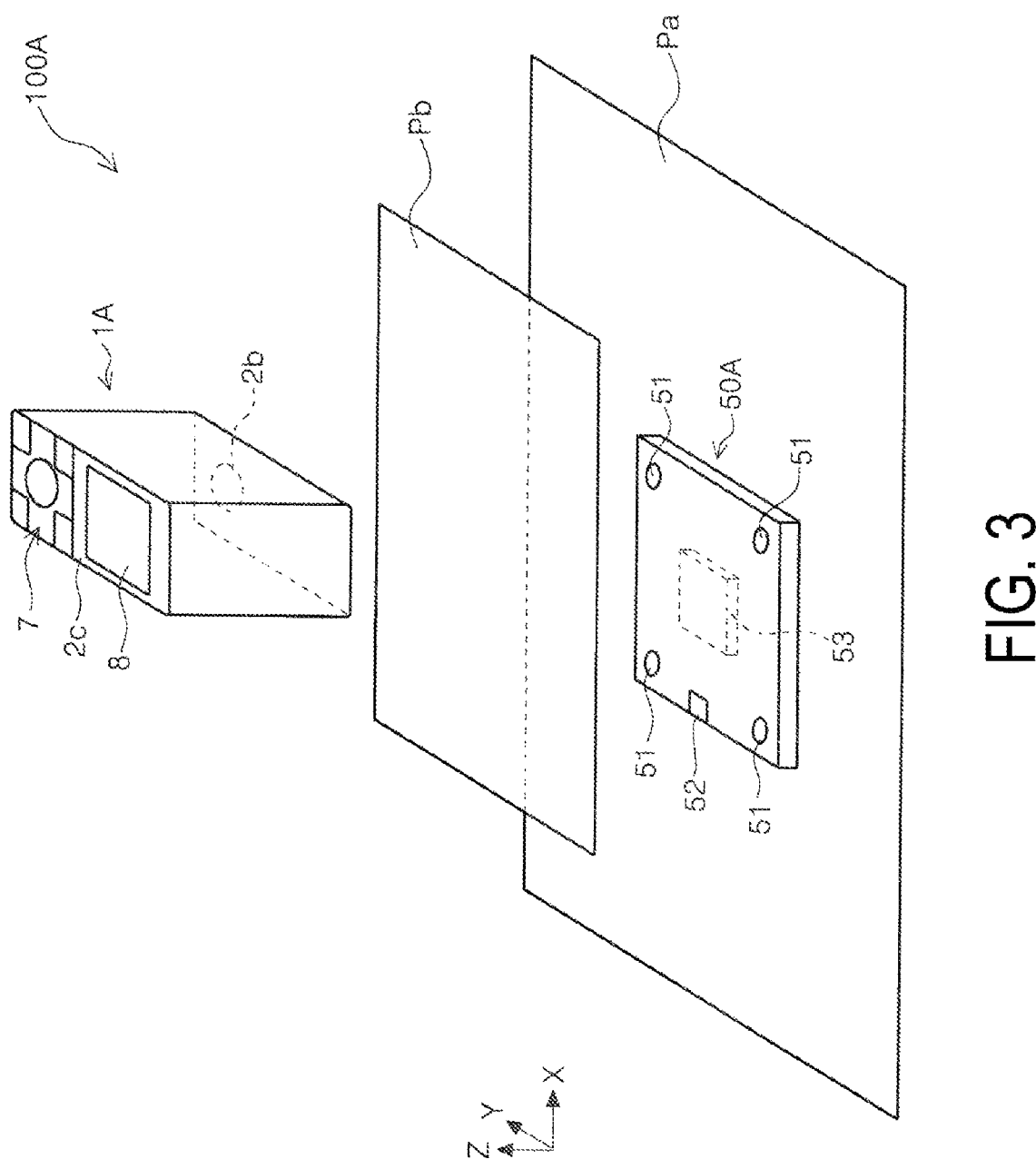
FIG. 3 is a perspective view of a color measuring system, a color measuring apparatus, and a backing plate according to a first embodiment.

FIG. 3 illustrates a state in which the backing plate 50A is placed on the placement surface Pa, and the sheet-shaped color measurement target Pb and the color measuring apparatus 1A are to be placed from above the backing plate 50A. FIG. 4 illustrates a state in which the backing plate 50A is placed on the placement surface Pa, the color measurement target Pb is placed thereon, and the color measuring apparatus 1A is to be placed from above the color measurement target Pb.

As an example, an upper surface of the backing plate 50A is a white backing surface conforming to ISO 13655, which is an international standard, and the color measuring apparatus 1A performs color measurement of the sheet-shaped color measurement target Pb in a state where the backing plate 50A is disposed under the color measurement target Pb. The same also applies to the other embodiments described below.

The backing plate 50A includes alignment units for the alignment between the backing plate 50A and the color measuring apparatus 1A in a state where the backing plate 50A is entirely covered with the color measurement target Pb. Regarding this point, the same also applies to the other embodiments described below.

In the first embodiment, the alignment units include light-emitting units 51.

A battery 53 for light emission is provided inside the backing plate 50A, and the light-emitting units 51 are supplied with power from the battery 53 for light emission and thus emits light. The light-emitting units 51 are configured such that light can be turned on and off using a switch 52. The light-emitting units 51 and the switch 52 are provided so as not to protrude from the upper surface of the backing plate 50A. Note that in the first embodiment, the battery 53 for light emission is a secondary battery that can be repeatedly used by being charged. The battery 53 for light emission can be charged by obtaining power from an external device or an external power source via a connector (not illustrated) provided at the backing plate 50A. Note that the battery 53 for light emission may be configured to be charged by providing a solar panel (not illustrated) at the backing plate 50A.

Figure 4:
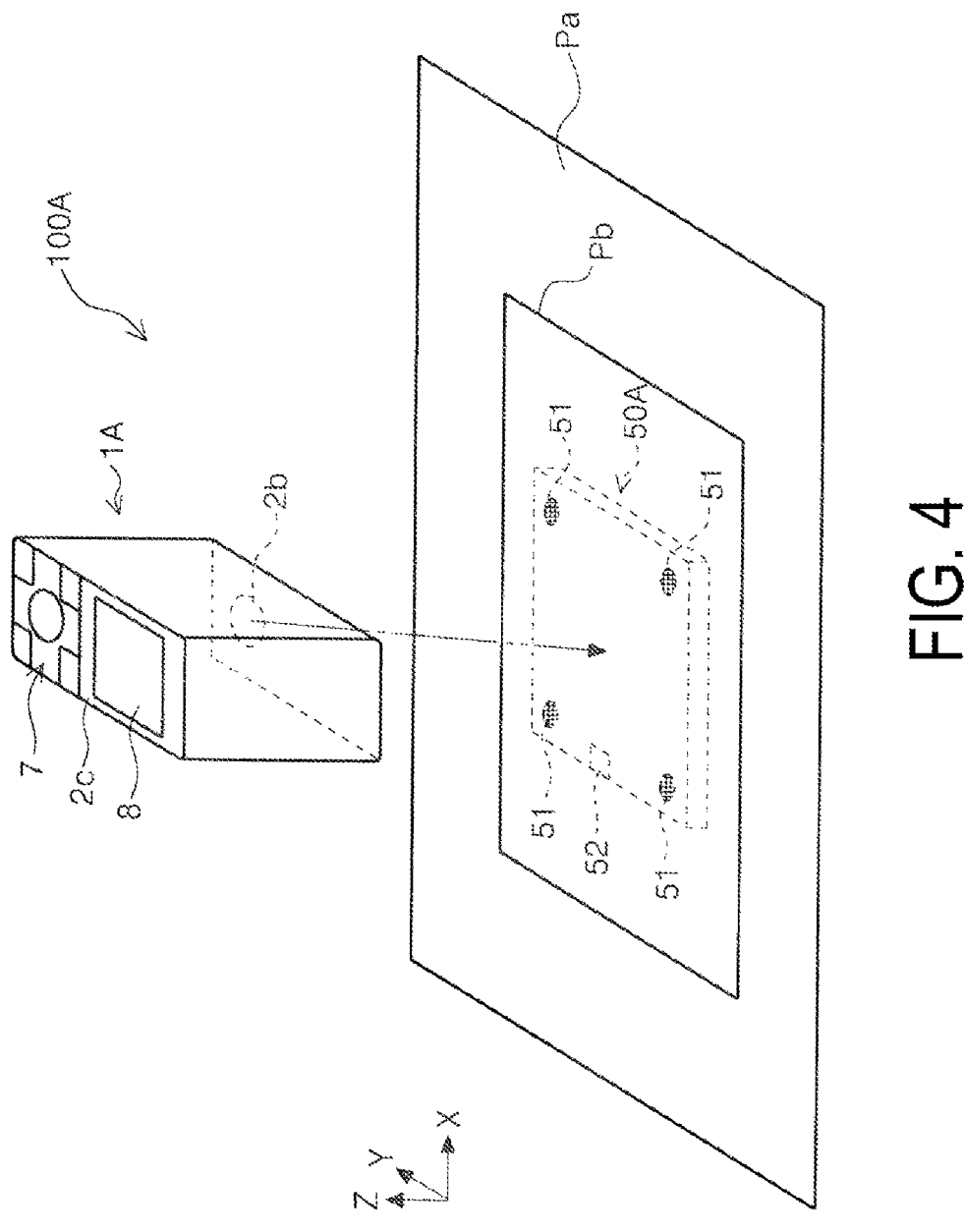
FIG. 4 is a perspective view of the color measuring system, the color measuring apparatus, and the backing plate according to the first embodiment.

In FIGS. 3 and 4, the area of the backing plate 50A on the XY plane is smaller than the area of the color measurement target Pb, and as illustrated in FIG. 4, the backing plate 50A can be entirely hidden under the color measurement target Pb. In this state, it is difficult to know the position of the backing plate 50A, and the opening portion 2b of the color measuring apparatus 1A, i.e., the color measurement position, may be located outside the backing plate 50A. However, when light emitted from the light-emitting units 51 passes through the color measurement target Pb as illustrated in FIG. 4, it is possible to know the position of the backing plate 50A. Thus, the backing plate 50 and the color measuring apparatus 1 can be aligned, and color measurement can be appropriately performed.

Note that in the first embodiment, the light-emitting units 51 are provided at four corners of the backing plate 50A, but the embodiment is not limited thereto, and it is only required that at least one light-emitting unit 51 be provided. However, providing the plurality of light-emitting units 51 makes it easy to know the position of the backing plate 50A. In particular, providing the light-emitting units 51 at the four corners of the backing plate 50A as in the first embodiment makes it easy to know the position of the entire backing plate 50A.

Note that the light-emitting units 51 can include white LEDs as an example.

Second Embodiment

Next, a color measuring system, a color measuring apparatus, and a backing plate according to a second embodiment will be described with reference to FIG. 5. Note that when configurations in each of the embodiments described below are identical to those in the above-described embodiment, they will be denoted by the same reference signs and redundant descriptions will be omitted. Further, in each of the embodiments described below, the placement surface Pa and the color measurement target Pb illustrated in FIGS. 3 and 4 are omitted.

Figure 5:
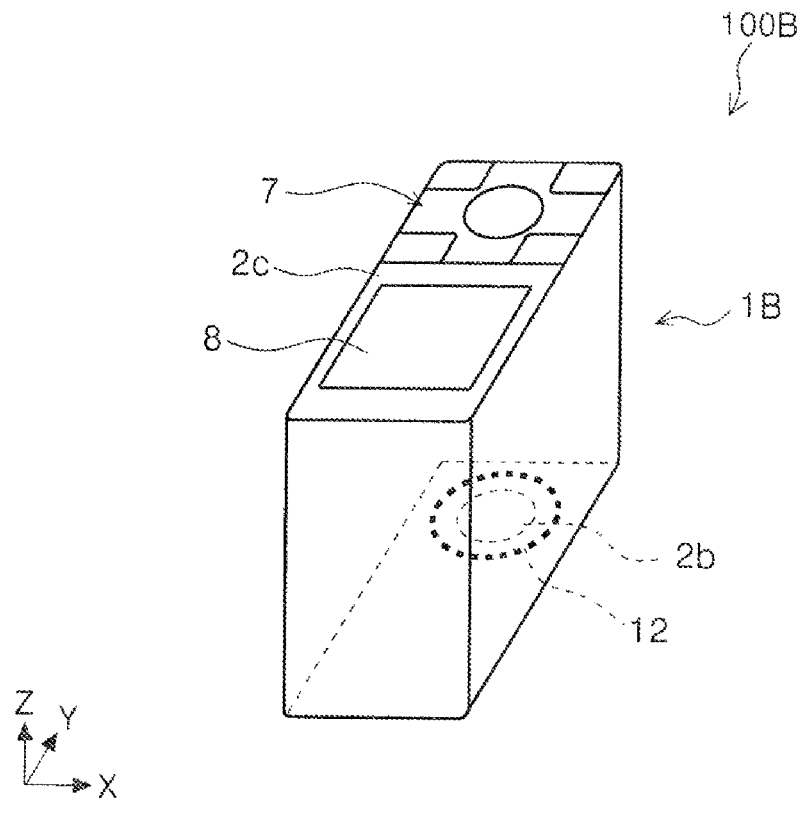
FIG. 5 is a perspective view of a color measuring system, a color measuring apparatus, and a backing plate according to a second embodiment.
Figure 5:
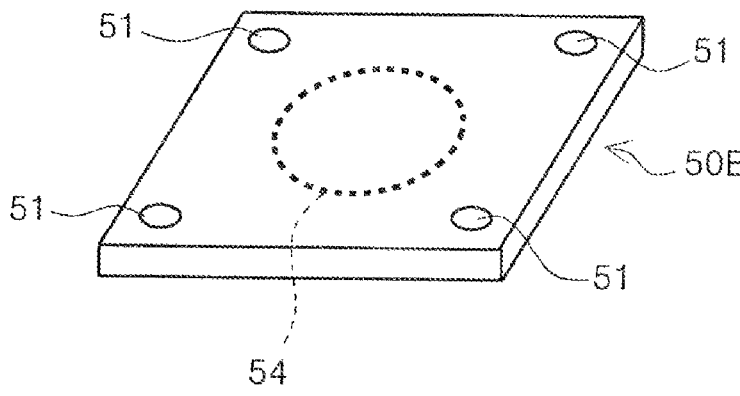

FIG. 5 illustrates a color measuring system 100B, a color measuring apparatus 1B, and a backing plate 50B according to the second embodiment.

The backing plate 50B includes a power-receiving coil 54 obtaining power from the color measuring apparatus 1B via a power-transmitting coil 12 provided at the color measuring apparatus 1B. That is, the power-transmitting coil 12 and the power-receiving coil 54 constitute a wireless power supply system. Light-emitting units 51 are configured to receive power from the power-receiving coil 54 and emit light.

The color measuring apparatus 1B includes the power-transmitting coil 12 at a position facing the backing plate 50B disposed under the color measurement target Pb, and the power-transmitting coil 12 supplies power to the light-emitting units 51 provided at the backing plate 50 via the power-receiving coil 54 provided at the backing plate 50B.

The color measuring system 100B includes the color measuring apparatus 1B and the backing plate 50B configured as described above.

Such a configuration facilitates reduction of the thickness of the backing plate 50 compared to a configuration including a battery, thereby improving the portability of the backing plate 50B and facilitating a color measurement operation.

Third Embodiment

Figure 6:
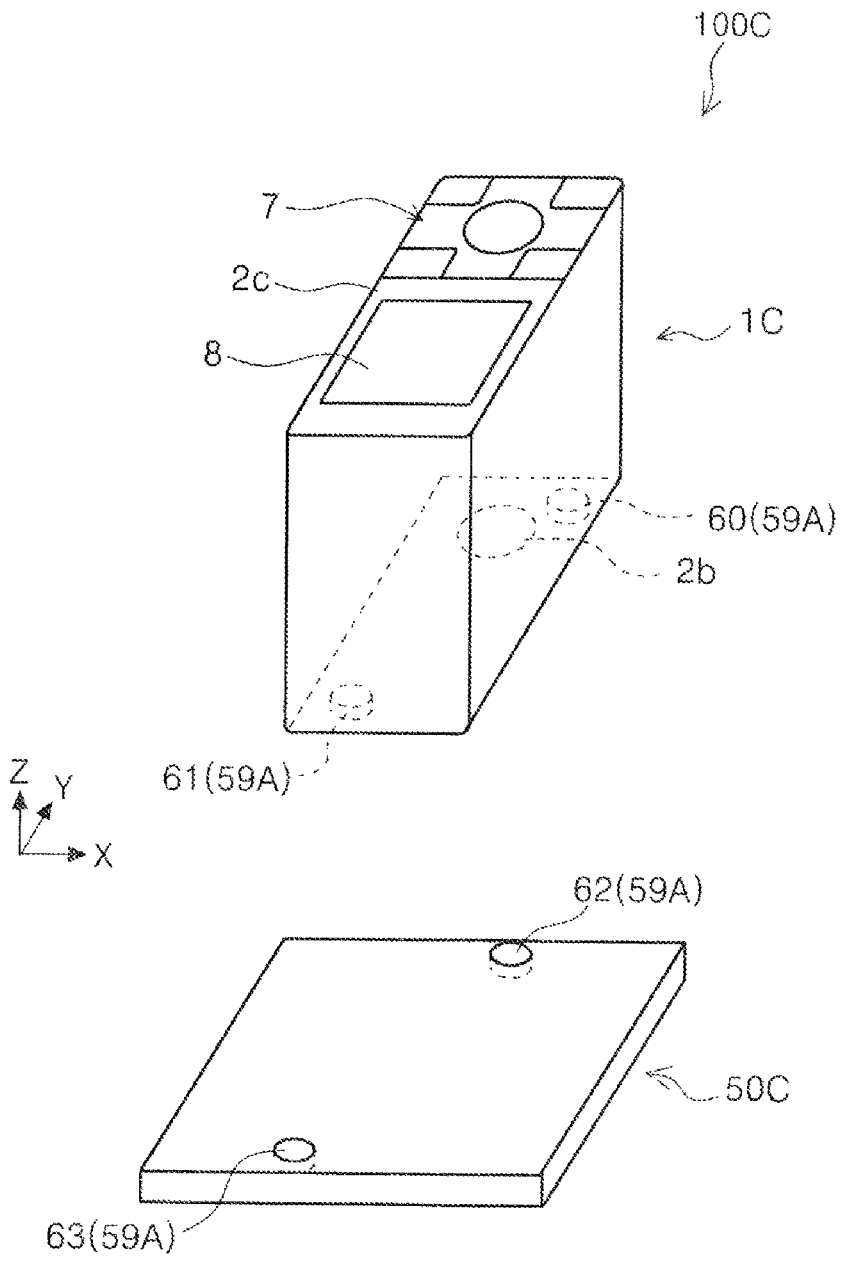
FIG. 6 is a perspective view of a color measuring system, a color measuring apparatus, and a backing plate according to a third embodiment.

Next, a color measuring system, a color measuring apparatus, and a backing plate according to a third embodiment will be described with reference to FIG. 6. FIG. 6 illustrates a color measuring system 100C, a color measuring apparatus 1C, and a backing plate 50C according to the third embodiment.

The backing plate 50C includes permanent magnets at positions facing the color measuring apparatus 1C. In the following, the permanent magnets are examples of magnets. The reference sign 62 denotes a plate-side first permanent magnet, and the reference sign 63 denotes a plate-side second permanent magnet.

In contrast, permanent magnets are also provided at positions of the color measuring apparatus 1C facing the backing plate 50C. The reference sign 60 denotes an apparatus-side first permanent magnet, and the reference sign 61 denotes an apparatus-side second permanent magnet.

The color measuring system 100C includes the color measuring apparatus 1C and the backing plate 50C as described above.

The plate-side first permanent magnet 62, the plate-side second permanent magnet 63, the apparatus-side first permanent magnet 60, and the apparatus-side second permanent magnet 61 constitute alignment units 59A for the alignment between the color measuring apparatus 1C and the backing plate 50C.

The distance between the plate-side first permanent magnet 62 and the plate-side second permanent magnet 63 on the XY plane is equal to the distance between the apparatus-side first permanent magnet 60 and the apparatus-side second permanent magnet 61 on the XY plane. Thus, with the plate-side first permanent magnet 62 and the apparatus-side first permanent magnet 60 facing each other, the plate-side second permanent magnet 63 and the apparatus-side second permanent magnet 61 can face each other.

The plate-side first permanent magnet 62 and the apparatus-side first permanent magnet 60 have opposite polarities facing each other. For example, the S-pole of the plate-side first permanent magnet 62 faces the color measuring apparatus 1C, and the N-pole of the apparatus-side first permanent magnet 60 faces the backing plate 50C.

The plate-side second permanent magnet 63 and the apparatus-side second permanent magnet 61 also have opposite polarities facing each other. For example, the N-pole of the plate-side second permanent magnet 63 faces the color measuring apparatus 1C, and the S-pole of the apparatus-side second permanent magnet 61 faces the backing plate 50C.

According to the configuration described above, an attracting force can be obtained between the plate-side first permanent magnet 62 and the apparatus-side first permanent magnet 60, and an attracting force can be obtained between the plate-side second permanent magnet 63 and the apparatus-side second permanent magnet 61. Thus, the backing plate 50C and the color measuring apparatus 1C can be aligned, and color measurement can be appropriately performed.

In the embodiment described above, as an example, the S-pole of the plate-side first permanent magnet 62 and the N-pole of the apparatus-side first permanent magnet 60 face each other, and the N-pole of the plate-side second permanent magnet 63 and the S-pole of the apparatus-side second permanent magnet 61 face each other. However, it goes without saying that the embodiment is not limited thereto.

Additionally, in the embodiment described above, the apparatus-side first permanent magnet 60 and the apparatus-side second permanent magnet 61 differ in the polarity facing the backing plate 50C, and the plate-side first permanent magnet 62 and the plate-side second permanent magnet 63 differ in the polarity facing the color measuring apparatus 1C. Thus, when the color measuring apparatus 1C in the state illustrated FIG. 6 is, for example, rotated by 180° on the XY plane, the same polarities of the permanent magnets of the color measuring apparatus 1C and the backing plate 50C face each other, and the magnets do not attract each other. Such a configuration allows the color measuring apparatus 1C to have one posture with respect to the backing plate 50C. Thus, the opening portion 2b serving as the color measurement position can surely face the backing plate 50C.

However, the polarity, facing the backing plate 50C, of the apparatus-side first permanent magnet 60 may be the same as the polarity, facing the backing plate 50C, of the apparatus-side second permanent magnet 61, and the polarity, facing the color measuring apparatus 1C, of the plate-side first permanent magnet 62 may be the same as the polarity, facing the color measuring apparatus 1C, of the plate-side second permanent magnet 63. In this case, it is preferable that the opening portion 2b be configured not to be located outside the backing plate 50C even when the color measuring apparatus 1C in the state illustrated in FIG. 6 is rotated by 180° on the XY plane.

Further, in the embodiment described above, the apparatus-side first permanent magnet 60 and the apparatus-side second permanent magnet 61 are disposed at corners of the bottom surface of the apparatus on a diagonal line, but it goes without saying that the embodiment is not limited thereto. For example, these magnets may be disposed around the opening portion 2b. Additionally, in the embodiment described above, each of the color measuring apparatus 1C and the backing plate 50C includes the two permanent magnets, but the embodiment is not limited thereto, and each of the color measuring apparatus 1C and the backing plate 50C may include one or three or more permanent magnets.

Additionally, in the embodiment described above, each of the color measuring apparatus 1C and the backing plate 50C includes the permanent magnets, but one of the color measuring apparatus 1C and the backing plate 50C may include permanent magnets and the other may include metallic members.

Further, in the embodiment described above, electromagnets may be used instead of the apparatus-side first permanent magnet 60 and the apparatus-side second permanent magnet 61. The electromagnets are normally in a non-energized state and are brought into an energized state when the color measuring apparatus 1C is aligned with the backing plate 50C. Switching of the electromagnets from the non-energized state to the energized state may be performed by providing a dedicated switch or performed when the apparatus is turned on. Such a configuration prevents the magnets of the color measuring apparatus and the backing plate from accidentally attracting each other and thus facilitates the alignment between the color measuring apparatus and the backing plate. Moreover, the magnets of the backing plate may be electromagnets, and the electromagnets may be brought into the energized state upon receipt of power from the wireless power supply system described above.

Fourth Embodiment

Figure 7:
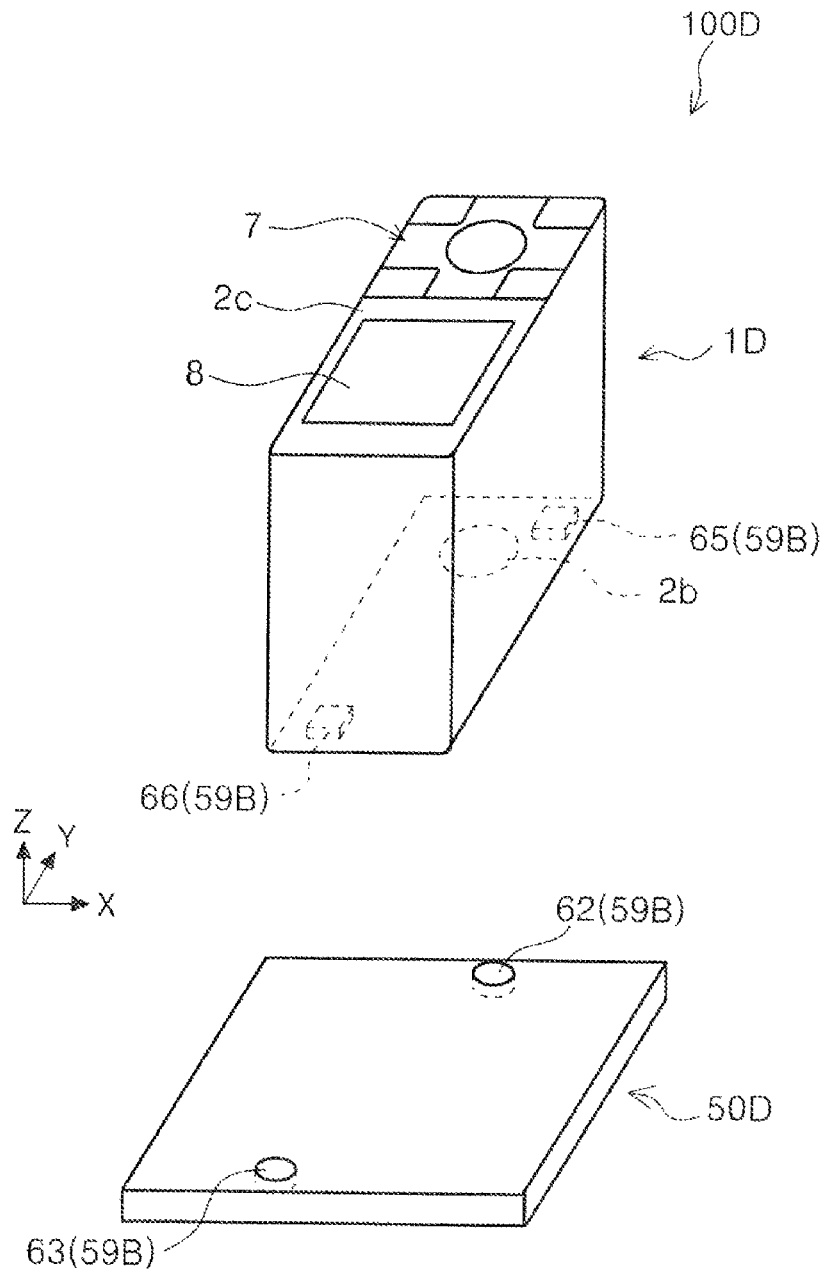
FIG. 7 is a perspective view of a color measuring system, a color measuring apparatus, and a backing plate according to a fourth embodiment.

Next, a color measuring system, a color measuring apparatus, and a backing plate according to a fourth embodiment will be described with reference to FIG. 7. FIG. 7 illustrates a color measuring system 100D, a color measuring apparatus 1D, and a backing plate 50D according to the fourth embodiment.

The backing plate 50D according to the fourth embodiment includes a plate-side first permanent magnet 62 and a plate-side second permanent magnet 63 in a manner similar to the backing plate 50C according to the third embodiment described above. As an example, the S-pole of the plate-side first permanent magnet 62 faces the color measuring apparatus 1D. Moreover, as an example, the N-pole of the plate-side second permanent magnet 63 faces the color measuring apparatus 1D.

The color measuring apparatus 1D includes a first magnetic sensor 65 at a position that faces the backing plate 50D and where the plate-side first permanent magnet 62 is detectable, and a second magnetic sensor 66 at a position where the plate-side second permanent magnet 63 is detectable.

The color measuring system 100D includes the color measuring apparatus 1D and the backing plate 50D as described above.

The plate-side first permanent magnet 62, the plate-side second permanent magnet 63, the first magnetic sensor 65, and the second magnetic sensor 66 constitute alignment units 59B for the alignment between the color measuring apparatus 1D and the backing plate 50D.

According to the configuration described above, the first magnetic sensor 65 detects the plate-side first permanent magnet 62, and the second magnetic sensor 66 detects the plate-side second permanent magnet 63. Thus, the backing plate 50D and the color measuring apparatus 1D can be aligned, and color measurement can be appropriately performed.

In the fourth embodiment, a plurality of pairs of the permanent magnet and the magnetic sensor are provided as described above. When all of the magnetic sensors (the first magnetic sensor 65 and the second magnetic sensor 66) detect the permanent magnets (the plate-side first permanent magnet 62 and the plate-side second permanent magnet 63) on the other side, the control unit 9 (see FIG. 2) of the color measuring apparatus 1D displays, on the display unit 8, information that all of the magnetic sensors detect the permanent magnets on the other side.

This enables the user to easily understand that the backing plate 50D and the color measuring apparatus 1D are aligned and thus improves the usability.

Note that the display unit 8 can display a message such as "the apparatus is aligned with the backing plate". Instead of the display on the display unit 8, or in addition to the display on the display unit 8, for example, a beeping sound may be emitted.

An operation unit 7 for performing various operations is provided on the upper surface 2c.

Note that, in the embodiment described above, two pairs of the permanent magnet and the magnetic sensor are provided, but the embodiment is not limited thereto, and the number of pairs may be one or three or more.

Additionally, either the S-pole or the N-pole of each of the plate-side first permanent magnet 62 and the plate-side second permanent magnet 63 may face the color measuring apparatus 1D. However, when the S-pole of one of the plate-side first permanent magnet 62 and the plate-side second permanent magnet 63 faces the color measuring apparatus 1D and the N-pole of the other faces the color measuring apparatus 1D, the orientation of the color measuring apparatus 1D can be controlled by detecting the difference in the polarity.

Note that the present disclosure is not limited to the embodiments described above, and many variations are possible within the scope of the disclosure as described in the appended claims. It goes without saying that such variations also fall within the scope of the disclosure.

What is claimed is:

1. A backing plate disposed under a color measurement target to be subjected to color measurement by a color measuring apparatus, the backing plate comprising:

an alignment unit with which alignment between the backing plate and the color measuring apparatus is performed in a state where the backing plate is disposed under the color measurement target and entirely covered with the color measurement target;

a light-emitting unit included in the alignment unit and configured to emit light toward the color measurement target; and a power-receiving coil configured to obtain power via a power-transmitting coil provided at the color measuring apparatus, wherein the light-emitting unit receives power from the power-receiving coil and emits light.

2. A color measuring system comprising:

a color measuring apparatus configured to perform color measurement of a color measurement target;

a backing plate disposed under the color measurement target; and an alignment unit with which alignment between the backing plate and the color measuring apparatus is performed in a state where the backing plate is disposed under the color measurement target and entirely covered with the color measurement target, wherein the alignment unit includes a light-emitting unit provided at the backing plate, the light-emitting unit being configured to emit light toward the color measurement target.

3. The color measuring system according to claim 2, wherein the color measuring apparatus includes a power-transmitting coil, the backing plate includes a power-receiving coil configured to obtain power via the power-transmitting coil, and the light-emitting unit receives power from the power-receiving coil and emits light.

* * * * *